(12) United States Patent
Zhang et al.

(10) Patent No.: US 7,835,743 B2
(45) Date of Patent: Nov. 16, 2010

(54) SEAMLESS NETWORK INTERFACE SELECTION, HANDOFF AND MANAGEMENT IN MULTI-IP NETWORK INTERFACE MOBILE DEVICES

(75) Inventors: Tao Zhang, Fort Lee, NJ (US); Kim Byungsusk, Edgewater, NJ (US); Toshikazu Kodama, Morristown, NJ (US); Shinichi Baba, Kawasaki (JP); Miriam Tauil, Berkeley Heights, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 24 days.

(21) Appl. No.: 11/196,517

(22) Filed: Aug. 3, 2005

(65) Prior Publication Data

US 2007/0030826 A1    Feb. 8, 2007

(51) Int. Cl.
*H04W 36/00* (2009.01)
(52) U.S. Cl. .................. 455/436; 455/437; 455/438
(58) Field of Classification Search .............. 455/436, 455/437, 438
See application file for complete search history.

(56) References Cited

U.S. PATENT DOCUMENTS 6,546,425 B1   4/2003 Hanson et al.

| 2004/0077341 | A1* | 4/2004 | Chandranmenon et al. .. 455/418 |
| 2004/0198220 | A1* | 10/2004 | Whelan et al. ............. 455/41.1 |
| 2005/0119001 | A1* | 6/2005 | Watanabe .................... 455/436 |
| 2006/0084417 | A1* | 4/2006 | Melpignano et al. ........ 455/418 |
| 2006/0268711 | A1* | 11/2006 | Doradla et al. .............. 370/235 |
| 2006/0291419 | A1* | 12/2006 | McConnell et al. ......... 370/331 |

FOREIGN PATENT DOCUMENTS

EP    1349322 A1    10/2003

\* cited by examiner

*Primary Examiner*—Barry W Taylor
(74) *Attorney, Agent, or Firm*—Watchstone P&D, PLLC

(57) ABSTRACT

A Multi-Interface Mobility Management (MIMM) client is provided on a mobile Multi-Interface Device (MID) to support seamless network connectivity and switching of the MID. The MIMM client communicates with a MIMM Server. The MIMM Server collects information from MIMM Clients and provides information to the MIMM Clients pertaining to the network(s) to which the mobile MID has access, such as information concerning the availability of a network, the quality of network connectivity, etc. The MIMM Client is responsible for determining whether and when a handoff or roaming operation should be initiated by the mobile MID, and which network interface the mobile MID should use after the handoff/roam operation has been completed. The MIMM Client also is responsible for performing mobility-related functions that are required prior and subsequent to the handoff/roam operation. The MIMM Client uses the information received from the MIMM Server in order to make these determinations.

27 Claims, 6 Drawing Sheets

SEAMLESS NETWORK INTERFACE SELECTION, HANDOFF AND MANAGEMENT IN MULTI-IP NETWORK INTERFACE MOBILE DEVICES

BACKGROUND

1. Field of the Invention

The present application relates generally to wireless networking, and more particularly to systems and methods for supporting the use of mobile devices having multiple heterogeneous network access interfaces, whereby such mobile devices may connect to different wireless networks and/or make use of various network access technologies.

2. General Background Discussion

Internet Protocol

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as layers including the network layer or layer-3 in the OSI model and the like) are referred to as the higher-layers.

Wireless Networks

Wireless networks can incorporate a variety of types of mobile devices, such as cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data.

Wireless LANs (WLANs) in which a mobile user can connect to a local area network (LAN) through a wireless connection may be employed for wireless communications. Wireless communications can include communications that propagate via electromagnetic waves, such as light, infrared, radio, microwave. There are a variety of different WLAN standards that currently exist, such as Bluetooth, IEEE 802.11, and HomeRF.

For example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

Similarly, IEEE 802.11 specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

Wireless networks also may involve methods and protocols found in Mobile IP (Internet Protocol) systems, in PCS systems, and in other mobile network systems. With respect to Mobile IP, this involves a standard communications protocol created by the Internet Engineering Task Force (IETF). With Mobile IP, mobile device users may move across networks while maintaining their IP Address assigned once. See Request for Comments (RFC) 3344. Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address by using a protocol such as Internet Control Message Protocol (ICMP).

In basic IP routing, routing mechanisms typically rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper netmask and a default router. Otherwise, routing protocols would not be able to deliver the packets properly.

Handoffs of Mobile Devices

In the context of a mobile device with an IP-based wireless network interface, the mobile device needs to perform roaming or handoffs when it moves from one network to another network, or from one access point of a network to another. With existing handoff methodologies, handoff is typically accomplished by performing the following sequence of protocol layer specific handoffs:

First, handoff takes place at the physical layer. In this regard, the mobile device switches its radio channel to a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Fourth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks.

Multiple Network Access Interface Mobile Devices

As the popularity and proliferation of wireless network access grows, more and more mobile devices are expected to have Multiple Interface Device (MID) capabilities. MIDs are mobile devices that contain two or more independent network interfaces, thus allowing the MID to have connectivity with two or more separate networks and/or make use of different network access technologies. The MID may have an IP address and a common IP (network) name associated with the IP address.

For example, an MID may have different wireless local-area (LAN) interfaces such as 802.11x (i.e., IEEE 802.11a, 802.11b or 802.11g), BlueTooth, HomeRF, or Wi-Fi, different wide-area (WAN) radio interfaces such as GPRS (General Packet Radio Service), 3G, 3GPP, 3GPP2, GSM (Global System for Mobile Communications), EDGE (Enhanced Data for GSM Evolution), TDMA (Time Division Multiple Access), or CDMA (Code Division Multiple Access), both LAN and WAN wireless network interfaces, or both wireless and wireline network interfaces.

Each network interface may contain addresses of varying types, such as an IP address, a Bluetooth Device Address, a Bluetooth Common Name, a Bluetooth IP address, a Bluetooth IP Common Name, an 802.11 IP Address, an 802.11 IP common Name, or an IEEE MAC address.

However, there exists a multitude of technical issues involved in supporting such multi-interface mobile devices that cannot be readily solved using known solutions. For example:

Switching between interfaces dynamically while ensuring uninterrupted communication. A moving mobile device must be able to switch from one interface to another as needed and ongoing communication should continue without excessive interruption. However, the network interfaces of a MID are randomly active and inactive as the mobile device is moving over a geographic region, such that it may be difficult to switch between interfaces quickly.

Selection of an interface to use for communication. A mobile device having multiple network access interfaces desirably should decide automatically which network interface is the best available for communication without requiring human intervention.

Automation of processes related to IP mobility. When a mobile device moves from one IP subnet (or domain) to another, several mobility related tasks should be done to allow IP networking in the newly accessed network. Such tasks include auto-configuration of the interface, user authentication and authorization to use the network, routing management, IP service configuration, etc. These tasks should typically be performed in a particular sequence for the mobile device to be able to use the network. It would be desirable to seamlessly and transparently perform these tasks without human intervention.

Consequently, there remains a need in the art for solutions to the above issues and problems related to support of functionality of wireless MIDs.

SUMMARY OF THE PREFERRED EMBODIMENTS

The preferred embodiments of the present invention fulfill the existing need as explained above by providing systems and methods for supporting IP-based mobile MIDs. According to one aspect of the invention, a Multi-Interface Mobility Management (MIMM) client is provided on a mobile MID. The MIMM Client communicates with a MIMM Server. The MIMM Server is an IP-based server that preferably resides in the IP core network that is used to interconnect the various radio networks, and to connect the radio networks to other IP networks, such as the Internet. The MIMM Server collects information from MIMM Clients and provides information to the MIMM Clients pertaining to the network(s) to which the mobile MID has access, such as information concerning the availability of a network, the quality of network connectivity, etc.

The MIMM Client is responsible for determining whether and when a handoff or roaming operation should be initiated by the mobile MID, and which network interface the mobile MID should use after the handoff/roam operation has been completed. The MIMM Client also is responsible for performing mobility-related functions that are required prior and subsequent to the handoff/roam operation. The MIMM Client uses the information received from the MIMM Server in order to make these determinations.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 1:
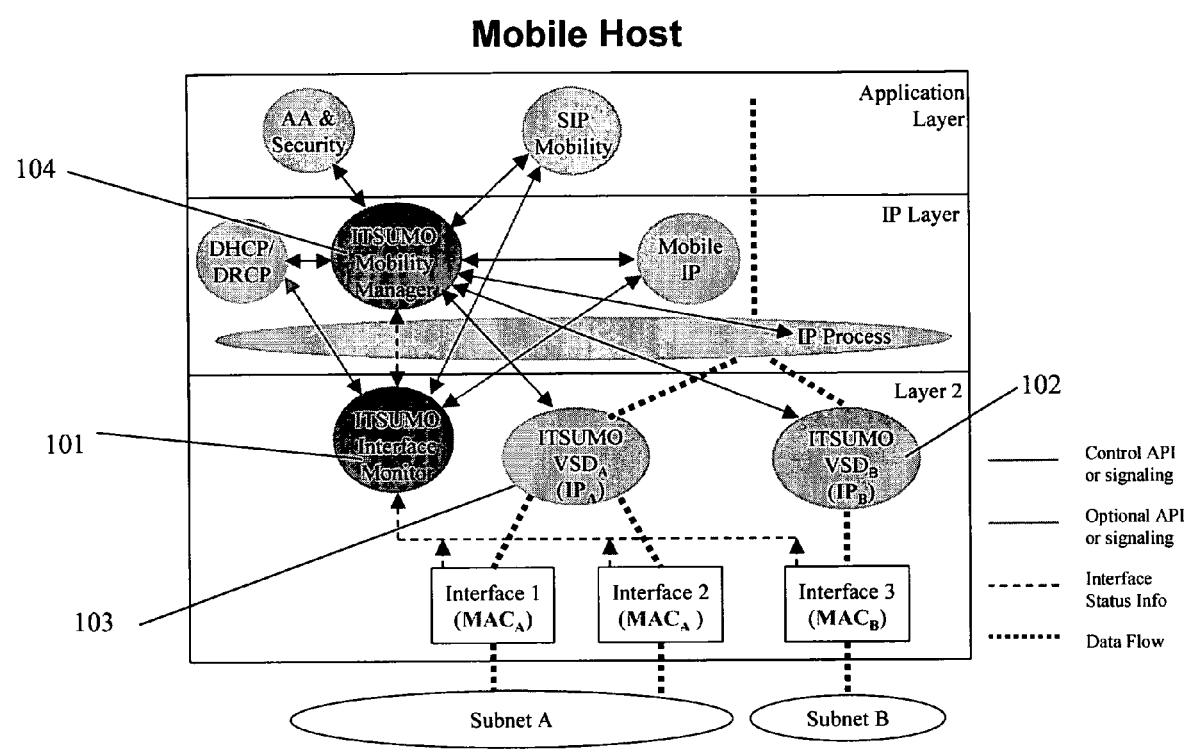
FIG. 1 is a diagram illustrating an implementation of a MIMM Client on a mobile Multi-Interface Device (MID) according to one preferred embodiment of the invention.

Referring now to FIG. 1, a MIMM Client according to an embodiment of the invention is a software component installed on a mobile MID that is responsible for determining whether and when a handoff/roaming operation should occur and which interface (i.e., network) the MID should use after such handoff/roam operation. The MIMM Client includes three main functional entities: an Interface Monitor (IM) 101, a Virtual Subnet Device (VSD) 102 and 103, and a Mobility Manager (MM) 104. The MIMM Client also manages mobility-related functions required prior to and after performing the handoff/roaming. MIMM Client can be run on the mobile terminal as an autonomous process making its own decisions and performing appropriate tasks. However, where the MIMM Server is present in the network, the MIMM Client may communicate with the MIMM Server and acquire information (or advice) to support the decision-making processes. The MIMM Client performs main functions relating to interface monitoring and management, mobility management, and mobility-related function management. For example, with respect to interface management, the MIMM Client monitors the Layer 3(L3)/ Layer 2 (L2)/ Layer 1 (L1) status of each interface, and either activates or deactivates interfaces that require configuration or connection setup (eq. PPP over Bluetooth or 3G) when necessary.

With respect to mobility management, the MIMM Client determines whether and when the terminal should handoff from one network to another; executes a handoff operation such as a fast Layer 2 handoff using the Virtual Subnet Device (VSD), and uses a mobility handling protocol (e.g., Mobile IP or Session Invitation Protocol (SIP) defined by the IETF) to initiate the Layer 3 handoff process; performs "Make-before-break" handoffs, and performs "Network-assisted" handoffs through communication with the MIMM Server.

Regarding mobility-related function management, the MIMM Client may initiate an interface auto-configuration process, may initiate Authentication, Authorization (AA) and security association clients/agents, may manage IP routing, and may perform miscellaneous configuration operations (e.g. name server, web proxy settings, etc.).

FIG. 1 shows the interaction of the functional modules of the MIMM Client with mobility-related clients/agents that perform interface configurations, M-related functions, security associations and Layer 3 (IP) mobility management. Each of the main functional modules will now be described.

Interface Monitor (IM)

The IM 101 constantly monitors the status of the network interfaces on the mobile MID. In FIG. 1, three network interfaces are shown for purposes of explanation, namely, Interfaces 1, 2 and 3, each having its own MAC address. However it will be appreciated that the invention is not restricted to any particular number of network interface devices that can be incorporated into a wireless mobile device, as the concepts of the invention are equally applicable to and implementable on any number of different network interface devices.

The status information may include, for example, whether an interface is up (i.e., active) or down (i.e., inactive), the radio quality (e.g., signal strength) of the interface if the interface is a wireless interface, the cable connection state if the interface is a wired interface, bit error rates, power consumption level, link rate, network attachment point (eq. WLAN Access Point), etc. The status information collected by the IM will be reported to any functional entity that subscribes to the interface status monitor service. The reporting may be performed either upon request, periodically, or only when changes occur. In accordance with the invention, one of the entities that subscribe to the status monitor service of the IM is the MM module 104.

Virtual Subnet Device (VSD)

The VSD is a shim layer between IP and physical network interfaces, which performs a L2 handoff. Each VSD aggregates physical interfaces connected to a single subnet and transparently selects the best available interface for the communication over the subnet. The selection of the best available interface is performed by the MM module 104 and it triggers the L2 handoff by the VSD. The details of the MM module are described below.

A separate VSD is instantiated per each subnet to which the mobile MID is connected, and it attaches multiple physical interfaces connected to the subnet. To the IP and higher networking layers, the VSD appears as a network interface and the actual physical interfaces attached to the VSD can be accessed through the VSD that attaches them. Actual physical interfaces also can be accessed directly as usual. However, in such case, the transparent L2 handoff capability provided by the VSD cannot be utilized. The VSD will be assigned an IP address from the subnet address pool and the attached physical interfaces shall have the same IP address as the VSD to which they are attached. Optionally, each physical interface attached to a VSD may have an identical L2 MAC address referred to as a Shadow MAC Address, to improve L2 handoff performance.

FIG. 1 shows an example where Interface 1 and Interface 2 are connected to a first subnet, Subnet A, and Interface 3 is connected to a second subnet, Subnet B. In the example of FIG. 1, VSD 102 attaches to Subnet B via Interface 3, VSD 103 attaches to Subnet A via Interface 1 and Interface 2, and communication of the wireless MID with each subnet will be done through the VSD that attaches the physical interfaces connected to each subnet. It is noted that a VSD is not needed if a MIMM Client is used to support only inter-subnet mobility.

Mobility Manager (MM)

The MM module 104 is responsible for determining which interface the mobile MID should use and when the mobile should switch from one interface to another. After a decision is made, the MM 104 is also responsible for signaling or spawning appropriate clients (agents) on the mobile MID that manage interface configurations, AA functions, security associations and mobility management in proper sequence.

Initially, the MM module 104 will search for active interfaces through a list of the network interfaces that are provided in the mobile MID, using the status information provided by the IM module 101. An active interface is one that is currently in a useable state. Among these active interfaces, the MM 104 will select a candidate interface based on a number of parameters, such as signal strength, network type and capability (i.e., whether it is WLAN, Bluetooth, cellular, etc.), user preference, power level, the cost of usage, etc. Once the candidate interface is selected, the MM 104 will determine the functions that need to be performed before the mobile MID can use the selected interface to send and receive user data over the network. Depending on the specific network, the following are examples of such functions:

Interface configuration (e.g. auto-configure). The interface configuration includes L2/L3 configuration and networking service configuration. L2/L3 configuration is related to enabling the interface to communicate with the network. L2 configuration sets an encryption key (WEP key in 802.11) and a network identifier (ESSID in 802.11) to access the physical link, and L3 configuration acquires an IP address, a network prefix length (subnet mask), a default router from the network, and configures the interface accordingly. Networking Service configuration is related to acquiring specific server addresses used in the network for such services as domain name service (DNS), web proxy/cache service, SIP proxy service, etc., to be used over the interface. L2 parameters will be kept by the MIMM Client and will be set directly by the MIMM Client. However, L3 and networking service configuration can be done using existing auto-configuration protocols such as DHCP (Dynamic Host Configuration Protocol) or DRCP (Dynamic and Robust Configuration Protocol).

AA related functions: e.g. subscriber authentication, and the establishment of security associations (e.g. IPSec) with the network.

When any of the above functions are required, the MM 104 will invoke the functional entity on the mobile MID that is responsible for performing these functions, with the new candidate interface as a parameter. The method invoking the functional entity may differ depending on how the entity is designed and what external interface the entity provides. Normally, each entity provides one or more of the following interfaces: 1) direct execution through the OS (Operating System) specific command-line interface, 2) API (Application Programming Interface) provided by the entity's software library, or 3) signaling through the OS specific inter-process signaling method. The MIMM Client provides process modules for each mobility-related function that can be customized to use any of the above methods to invoke a specific functional entity.

The MM 104 will then invoke the appropriate IP mobility management client (agent) such as Mobile IP agent or SIP Mobility client to handle the actual handoff of user traffic. After the handoff, the candidate interface becomes the primary active interface. The primary active interface is the interface currently being used by the mobile MID for communication. When the candidate interface becomes the primary active interface, MM will also manage IP routing table to insure the communication over the primary active interface.

The MM 104 constantly acquires interface status information from the IM 101, and based on above-mentioned parameters, it will probe for a potentially better interface (or a better network) for communication. To prevent unnecessarily frequent switching between two interfaces (or between two networks), the MM 104 uses multiple levels of thresholds and averaging for performance metrics such as signal strength, power level, etc. In anticipation that the mobile MID may need to use a new interface, the MM 104 can proactively activate the new interface for use where such interface is not constantly available. An example is an interface to a wireless network that uses point-to-point connections (e.g., GPRS, cdma2000, or Bluetooth). This allows the MM 104 to perform "make-before-break" handoffs, which significantly reduce handoff delays.

The "make-before-break" operation is done as follows:

First, the MM 104 detects either that the status of the current primary active interface is deteriorating or that the user preference has been changed to select another device as the preferred primary active interface. The MM 104 then scans for a new candidate active interface to which to switch over. If the preferred interface is not on the list of the candidate active interfaces provided by the IM 101 (such as where user preference has selected a new interface), the MM may itself bring up the selected interface.

Next, if the network access using the candidate active interface requires IP mobility-related functions to be performed (e.g., when the new interface requires that the mobile MID use a new IP address, hence the mobile MID will have to register the new IP address with the mobility servers such as a Mobile IP Home Agent or a SIP server), the MM 104 instructs each functional component responsible for carrying out the needed mobility-related functions to take the appropriate actions before the actual switchover to the new network interface takes place. The MM 104 then instructs the mobility handling function to switchover the user traffic to the selected candidate interface. Each interface will have its own metric that represents the quality of the link. Normally the quality measure of a radio link could be measured with the signal level or power level. Signal or power levels are generally represented by SNR, CIR or RSSI.

Figure 2:
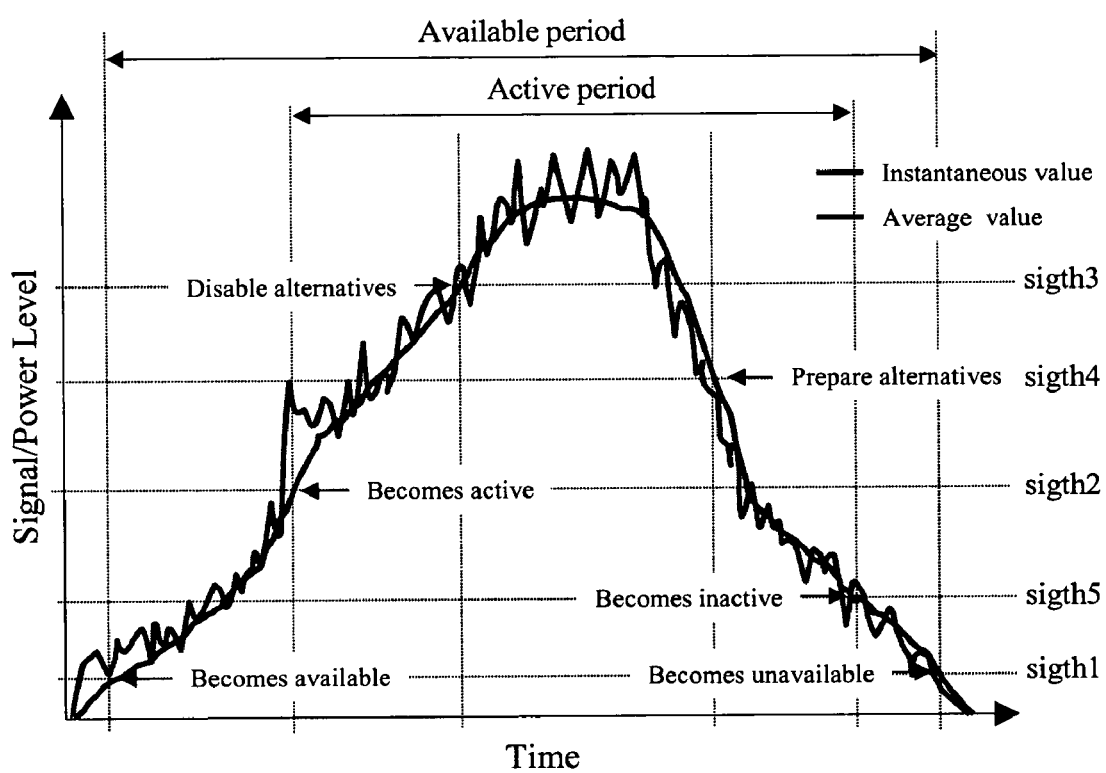
FIG. 2 is a graph showing an example of multiple signal threshold levels used to determine whether and when handoff/roaming operations should be performed in accordance with one embodiment of the invention.

FIG. 2 illustrates an example of multiple signal thresholds ("SigTh"). The example shows an implementation of 5 signal threshold levels:

SigTh1: Minimum signal level for the interface to be considered available.

SigTh2: Minimum signal level for the interface to be considered active. Only active interfaces would be considered acceptable candidate interfaces to hand off to.

SigTh3: Minimum signal level for the interface to be considered "stable". Above this level, other alternative interfaces that can be disconnected or turned off, could be disabled to reduce power consumption or the cost of usage.

SigTh4: When transition from the stable region crossing this level occurs, the MIMM Client proactively prepares alternative interfaces for possible hand off.

SigTh5: When the signal level of an active interface drops below this threshold level, the interface should be considered inactive. Handoff should be performed to an alternative interface when available.

The SigTh1 here could be 0 (zero), in which case the number of threshold levels implemented will be 4. In many systems including the traditional mobile cellular communication system, multiple (2 or 3) signal threshold levels are adopted to prevent a so-called "ping-pong" effect near the boundary of the coverage area, wherein a mobile device will be switched multiple times back and forth between the same two base stations or access point. The preferred embodiments of the present invention further enhance the multiple threshold concept to add thresholds (SigTh3 and SigTh4) to support "make-before-break" handoff operation between heterogeneous network interfaces.

The signal level is measured periodically, where the measurement period should be short enough to capture instantaneous changes. However, actual signal level (S) comparison with the threshold values should be made with an average value ($S_{avg}$) to prevent instability due to transient fluctuations in the radio quality. The average value could be obtained by using a moving average, a smoothed average or any other method that suits the physical characteristics of the radio device. Some example equations are shown below to evaluate the average signal strength ($S_{avg}[t]$) value where the instantaneous signal strength value is $S[t]$ at a given time t.

$$S_{avg}[t] = (\Sigma S[i])/n, \text{ where } i=1 \ldots n \quad (1)$$

$$S_{avg}[t] = (\Sigma S[i])/k, \text{ where } m<n, i=m \ldots n, k=n-m+1 \quad (2)$$

$$S_{avg}[t] = \alpha S_{avg}[t-1] + (1-\alpha)S[t], \text{ where } 0 \leq \alpha < 1 \quad (3)$$

With the above-defined five levels of signal threshold, when the average signal strength ($S_{avg}$) measured on a certain interface is above SigTh1, the MM 104 considers the interface to be "available". In the "available" state, the interface will be monitored constantly but the MM will give the lowest priority to that interface when selecting a candidate interface to hand off to. When the $S_{avg}$ goes above SigTh2, the interface is considered to be "active". When the MM decides to hand off from the current interface to another interface, it will normally select a candidate interface among the "active" interfaces using various metrics such as signal level, bit rate, power consumption, fixed priority, user preference, etc. When none of the interfaces are in an "active" state, a similar comparison will be performed among the "available" interfaces. However, if there are interfaces that require configuration or connection setup (e.g. PPP connection setup for 3G cellular devices), before selecting among the "available" interfaces, the MM will try to activate these alternative interfaces first. The candidate interface becomes the primary active interface when the hand-off operation is finished and the interface is in use. When the $S_{avg}$ of the primary active interface becomes higher than SigTh3, the MM 104 considers the link quality of the interface to be stable and it will attempt to disable other alternative interfaces that can be disconnected or turned off, to reduce power consumption or the cost of usage. When the $S_{avg}$ of the primary active interface drops below SigTh4, the MM considers the link quality to be deteriorating and it starts to search for a new candidate interface among the active interfaces to prepare for a possibly imminent handoff. If no active interface is available, the MM will try to activate the "alternative" interfaces. If the $S_{avg}$ of the primary active interface drops below SigTh5, its status becomes "inactive" and the MM immediately will perform handoff to a candidate interface.

MIMM Server

Figure 3:
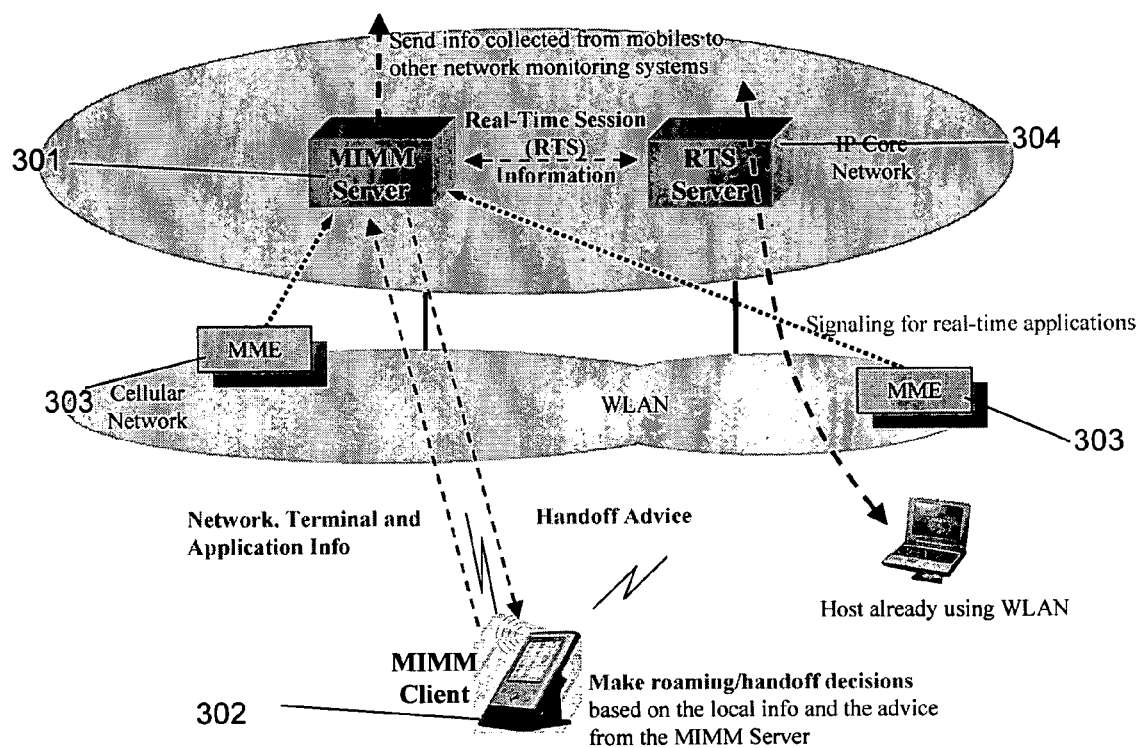
FIG. 3 is a diagram illustrating an example of a network-assisted MIMM operation in accordance with one embodiment of the invention.

In addition to the stand alone implementation of the MIMM Client on each mobile MID, a MIMM Server may be used to assist the MIMM Clients in making handoff/roaming decisions. As shown in FIG. 3, A MIMM Server 301 is an IP-based server that resides in the IP core network. Depending on how roaming/handoff operations between different types of networks is supported, the MIMM Server 301 could be deployed in different network providers. For example, a network provider that provides different types of radio networks (e.g., "hotspots" and cellular networks) could deploy MIMM Servers in its IP core networks to assist the handoff/roaming operations between its different types of radio networks. An enterprise network could deploy a MIMM Server in its enterprise network and use it to support the mobility of the enterprise users on public networks. In this case, enterprise users will subscribe to public networks (cellular and hotspot networks) and use these public networks only as packet transport pipes to the enterprise networks and roaming between different public networks will be anchored at the enterprise network, i.e., handled by the MIMM Server. The MIMM Server includes the following main functions:

Collects information from the mobile MIDs (i.e., from the MIMM Clients). Such information may include what networks a mobile MID has access to at the moment, the conditions of each network (e.g., signal to noise ratio), what application sessions are active on the mobile MID at the moment, the user's preference on the types of networks to use, etc.

Collects information from other network entities such as real-time session servers which maintain the number of on-going real-time sessions in a particular network and the traffic profile of each session, network management/monitoring entities that keep track of the network usage, the congestion state, resource availability, and other information relevant to the network conditions which cannot be directly known to the MIMM Server.

Provides information to the mobile MIDs (i.e., to the MIMM Clients). Such information may include estimates on the quality of the network connectivity between the mobile MID and the MIMM Server.

Provides proactive advice and/or decision directives to the MIMM Clients on whether and when a mobile MID should handoff/roam to a particular radio network. Such advice may be, for example, "proceed to move into network X now;" "do not move into network X at any time;" "do not move into network X now, but check again (or wait for new advice) in Y seconds;" or "move into network X only Y seconds after receiving the advice."

Provides reactive advice and/or decision directives to the MIMM Clients already in the network to handoff/roam to other network due to deteriorating network conditions or in response to any unexpected events. Such advice may be, for example, "move out from current network A due to condition X and move into network B now;" or "move out from current network A due to condition X and move into network B now. Then try network A again after Y seconds."

FIG. 3 shows an example configuration of the MIMM Server 301 and the MIMM Client 302 and the interactions between MIMM Server and MIMM Client. The MIMM Server collects information from each mobile MID currently within the service area of the MIMM Server and also from network management/monitoring entities (MMEs) 303. The MIMM Server then provides the MIMM Client on each mobile MID with network status information that will assist the MIMM Client to select the interface (or network) to use.

The MIMM Server 301 also can communicate with other network entities such as a RTS (Real-Time Session) server 304, in addition to MME 303, to acquire and/or to provide information relevant to the network conditions, which information cannot be directly known or easily obtained by the mobile MIDs. An example of the RTS Server is a SIP Server that keeps information on real-time SIP-based application sessions (e.g., on-going SIP sessions and their service descriptions which may include bandwidth requirements). Upon request by the MIMM Server, the RTS Server will return the on-going real-time session information of the network (e.g., the number of on-going SIP sessions and their bandwidth requirements at the moment). Although the MIMM Server and RTS Server are illustrated in FIG. 3 as separate entities in the network for illustrative purposes, they also can reside in a single server entity depending on the system architecture.

Proactive Handoff Advice

When the MIMM Client 302 on a mobile MID wishes to check if a candidate network is a good choice to handoff/roam into (e.g., using procedures described above), it will send a "Request Handoff" message to the MIMM Server 301. Based on the information gathered from various entities in the network and from all the mobile MIDs, the MIMM Server will determine whether allowing the requesting MIMM Client to handoff to the target candidate network will deteriorate the communication qualities of the existing real-time sessions in the target network as well as the qualities of the on-going sessions of the requesting mobile MID to unacceptable levels. The MIMM Server then sends a corresponding "Handoff Advice" as a response to the Request Handoff. The MIMM Client 302 will use the information acquired from the MIMM Server to make its handoff/roaming decisions.

The MIMM Server may communicate with the MIMM Client using any standard or non-standard protocol deemed appropriate by the implementers of the MIMM Server and MIMM Client. One approach is to use the mobility management protocol used by the MIMM Client to control the handoff/roaming at the IP layer or application layers. Such protocols may be Mobile IP (MIP) or the Session Invitation Protocol (SIP) specified by the Internet Engineering Task Force (IETF).

Consider for example that MIP is used not only as the handoff/roaming control protocol but also as the protocol for the MIMM Client and the MIMM Server to communicate. The MIMM Server could be integrated with the MIP Home Agent (HA) used for mobility control. The Request Handoff message from the MIMM Client to the MIMM Server will be a MIP Registration Request message with a Vendor/Organizational Specific Extension defined by the MIP standards for the MIP Registration Request. The Vendor/Organization Specific Extension will carry an indication to inform the MIMM Server that this MIP Registration Request message serves as a query to the MIMM Server to ask the MIMM Server for advice on whether and when the mobile MID could handoff/roam into a target network. The target network could be indicated to the MIMM Server by the Care-of Address carried in the MIP Registration Request. Alternatively, the target network can also be identified in any other way, e.g., by information carried in the Vendor/Organization Specific Extension. The Vendor/Organization Specific Extension will also carry all other necessary information (e.g., radio network conditions) that the MIMM Client wants to send to the MIMM Server. The Handoff Advice message sent back from the MIMM Server to the MIMM Client will be a MIP Registration Reply message with a Vendor/Organizational Specific Extension. The Vendor/Organizational Specific Extension will carry all the necessary information (e.g., handoff/roaming advice) that the MIMM Server wants to send to the MIMM Client.

When the mobility control protocol is also used as the protocol between the MIMM Server and the MIMM Client, the MIMM Server query and handoff/roaming control can be merged in some scenarios. Continuing the above example where MIP is used for handoff/roaming control as well as the communication between MIMM Server and MIMM Client, when the MIMM Server's response to a MIMM Client's Request Handoff message (i.e., a MIP Registration Request message) is "Go ahead and move into the target network," then the MIMM Server could proceed to complete all the necessary MIP HA operations necessary for the handoff/roaming and returns a Handoff Advice message (i.e., a MIP Registration Reply message) to the MIMM Client to inform the mobile MID that the mobile MID can proceed immediately to move into the target network and that the handoff/roaming has already been completed on the network side. Any another protocol also may be used for signaling between the MIMM Server and MIMM Client.

Figure 4:
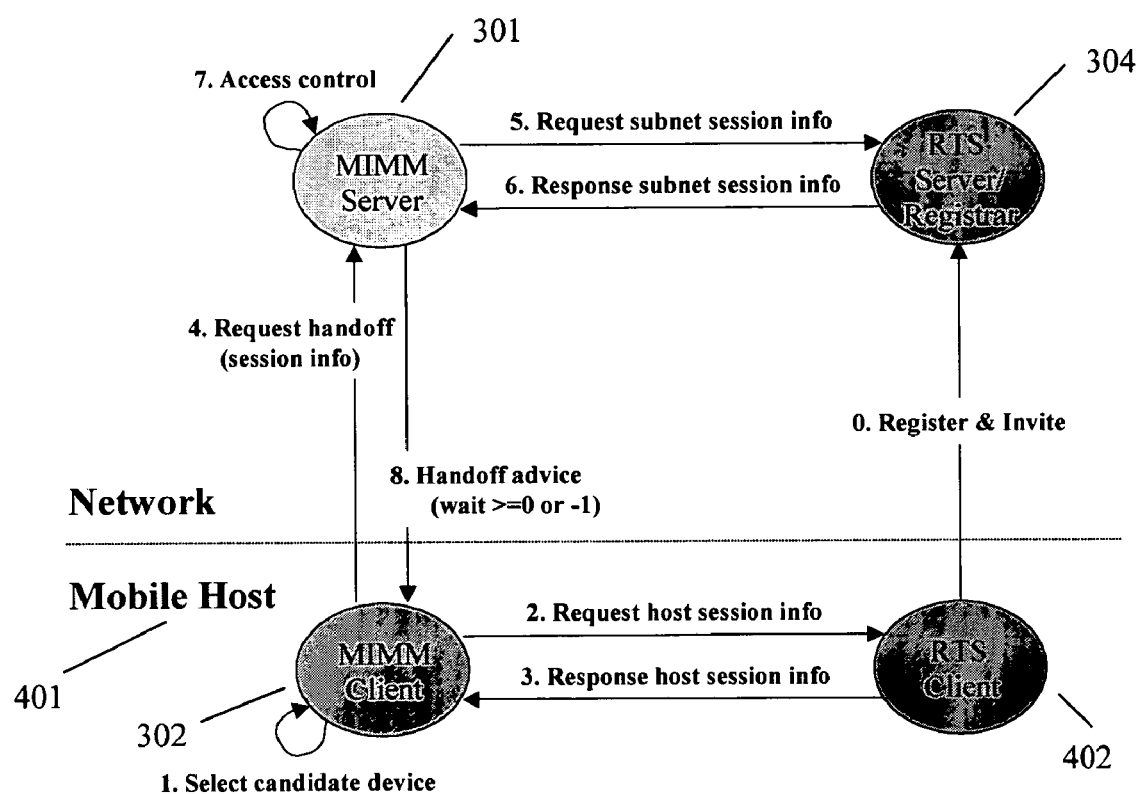
FIG. 4 is a diagram illustrating the flow of interactions between a MIMM Client and a MIMM Server according to one embodiment of the invention.

FIG. 4 shows an example of the MIMM Server and MIMM Client interaction for the network-assisted handoff operation. We assume that the Mobile Host (MH) 401 has a RTS Client 402 that has already registered its location to the RTS Server and has invited a corresponding host for a real-time session. As mentioned earlier, an example implementation of the RTS is SIP. The MIMM Client 302 on the MH will constantly be monitoring and managing the network interfaces on the host. When the MIMM Client decides to handoff, it selects a candidate interface device (Step 1 as shown). After selecting a candidate device, it sends to the RTS Client a "Request Host Session Info" message to acquire the information on the on-going real-time sessions (Step 2). The RTS Client will reply with a "Response Host Session Info" message that includes the session information such as number of sessions, bandwidth requirements for each session, traffic profile for each session, etc. (Step 3). The MIMM Client will then send "Request Handoff" message to the MIMM Server 301 including the session information acquired from the RTS Client (Step 4). Upon receiving this message, the MIMM Server will also ask the RTS Server by sending "Request Subnet Session Info" message to acquire the information on the on-going real-time sessions on the IP subnet to which the MH currently belongs (Step 5). The RTS Server will reply with a "Response Subnet Session Info" message that includes the session information such as number of sessions, bandwidth requirements for each session, traffic profile for each session, etc. (Step 6). The MIMM Server will then use the information gathered from the MH and the RTS Server as well as the network policy to estimate whether the MH could be admitted to the subnet without degrading the Quality of Service (QoS) of other on-going sessions as well as the sessions that the MH will continue to carry on (Step 7). If the MIMM Server decides that the handoff will impair QoS, it will send to the MIMM Client a "Handoff Advice" message (Step 8) with a wait-time set to a positive integer value. The positive integer wait-time value indicates that the MIMM Client is advised not to handoff immediately, but rather to inquire again after the indicated wait-time has elapsed. If the MIMM Server decides that the handoff will not impact the QoS, the reply will have the wait-time set to 0, which indicates that immediate handoff is possible. In the case where the MIMM Server decides not allow the MH to handoff to the network at any time it will return −1 as the wait-time.

Reactive Handoff Advice

The MIMM Server also can provide advice and/or decision directives to the MIMM Clients already in the network to handoff/roam to another network due to deteriorating network conditions or due to the occurrence of an unexpected event such as network congestion, fault management, temporary change of policy, etc. Such advice may be, for example, "Move out from current network A due to condition X and move into network B now;" or "Move out from current network A due to condition X and move into network B now. Then try network A again after Y seconds."

Figure 5:
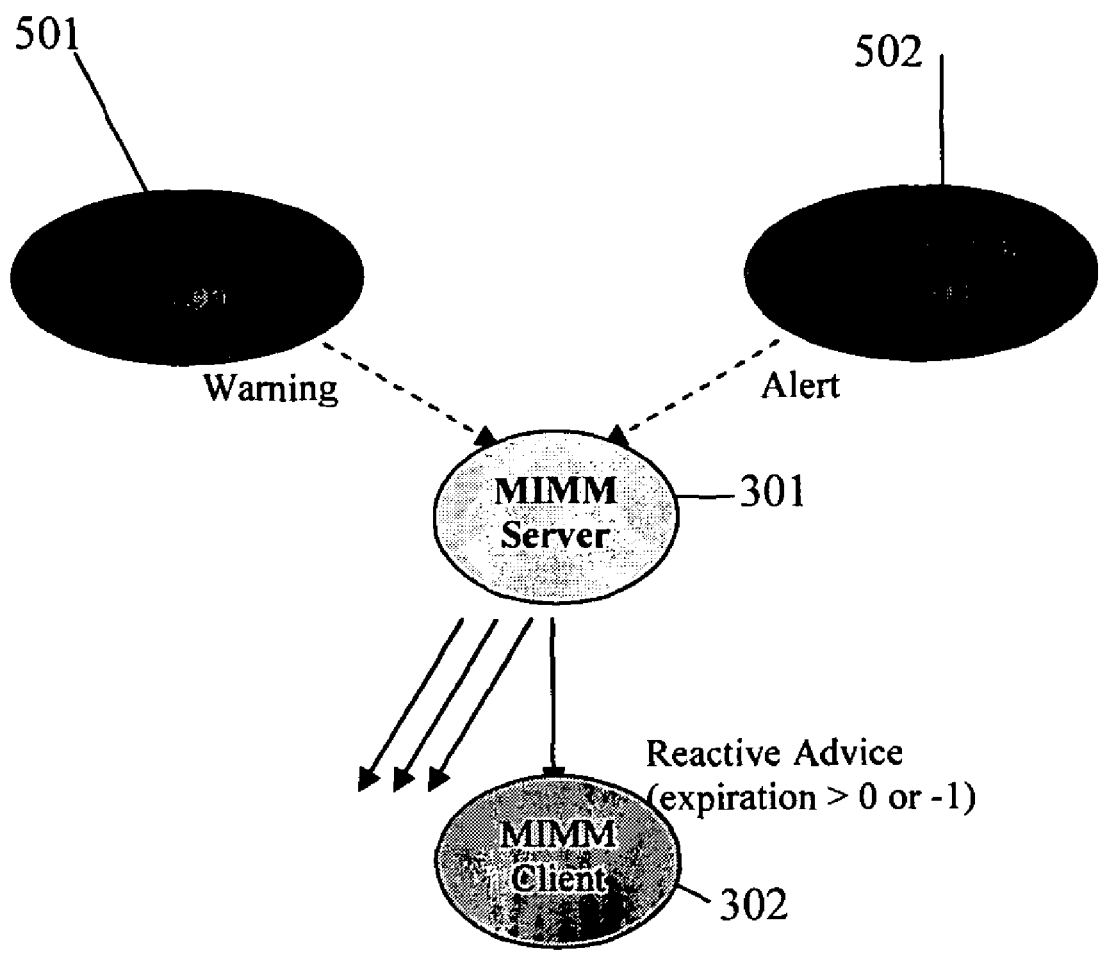
FIG. 5 is a diagram illustrating MIMM Server interactions with network management/monitoring entities (MMEs) and a MIMM client according to one embodiment of the invention.
Figure 6:
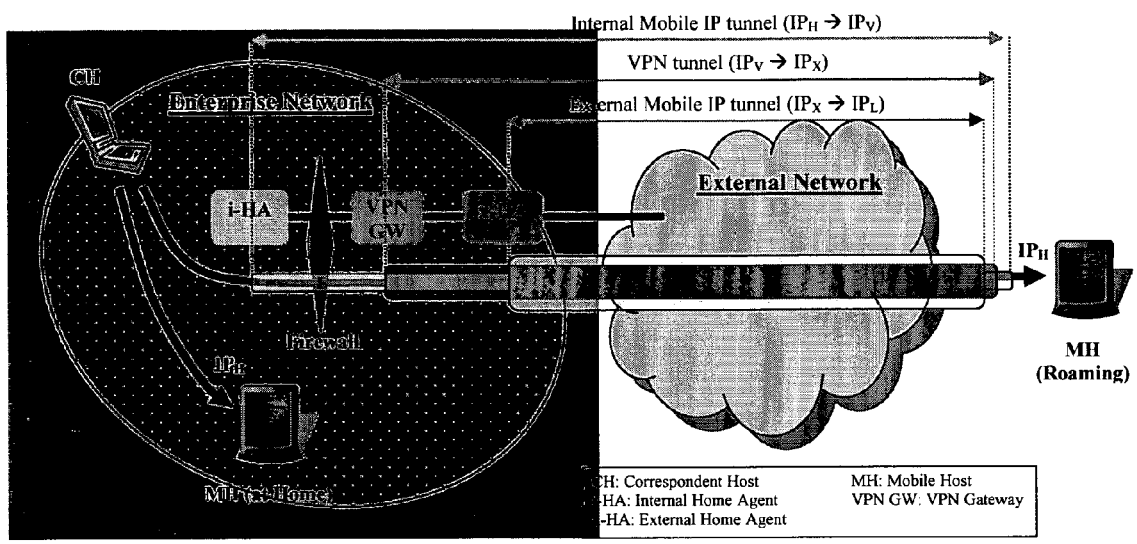
FIG. 6 is a schematic diagram of an example application of the present invention to a secure mobile host networking access.

As illustrated in FIG. 5, network management/monitoring entities (MME) 501, 502 may send alert or warning messages to MIMM Server 301 indicating that an unexpected event has occurred. The unexpected event can include but is not limited to:

Network congestion
Unusual traffic pattern
Fault management & maintenance
Resource depletion
Temporary change of policy Communication between the MMEs and the MIMM Server can be done using a proprietary protocol or a standard protocol such as Simple Network Management Protocol (SNMP) defined by IETF. MIMM Server 301 will then communicate with a set of MIMM Clients 302 or all the MIMM Clients in the impacted network (or region), advising to handoff out of the network (or the region) if alternative network access is available. The information in the "Reactive Advice" message should include the reason for the message, expiration-time of the advice, and optionally the alternative network to handoff/roam into. MIMM Clients 302 having alternative network connectivity then will try to select an alternative network and perform handoff to the selected network. The positive integer expiration-time value indicates that the MIMM Client should avoid the current network for the given amount of time. If the expiration-time value is −1, the MIMM Client is advised not to return to the network during the present session. After the expiration-time, the MIMM Client may select the network as a handoff/roaming destination candidate. The communication method between the MIMM Server and the Client could be 1) a periodic "push" by the MIMM Server 2) an event-driven "push" by the MIMM Server or 3) a periodic "pull" by the MIMM Client.

AN EXAMPLE APPLICATION OF THE INVENTION

A Mobile Host (MH) in an enterprise network can access the resources within the network and external to the network directly without any encapsulation or tunneling. Any Correspondent Host (CH) in the network can reach the MH using the MH's home IP Address (IPH). When the MH moves out of the enterprise network and moves into an external network provided by an entity such as an ISP, a cellular carrier or a hotspot provider using a network interface attached to the MH, the MH has to perform the following procedures if the user wishes to continuously access the enterprise network without any disruption in the ongoing communication sessions and also to be reached by other entities through its home IP address wherever it goes:

1. Select best available network connectivity and configure the interface;

2. Get authenticated, authorized into the network and obtain an IP address (IPL) locally from the visiting network;

3. Register using IPL as the care-of-address (COA) to the external Mobile IP Home Agent (x-HA) and obtain a dynamic home address (IPX). The x-HA will forward incoming packets for IPX to IPL through an encapsulation tunnel;

4. Register using IPX as the local address to the VPN Gateway (VPN GW) and obtain a VPN address (IPV). The VPN GW will forward incoming packets for IPV to IPX through an encryption (e.g. IPSEC) tunnel using IPX as the tunnel end;

5. Register to internal Mobile IP Home Agent (i-HA) using the IPV as the COA and IPH as the permanent home IP address. IPH can be assigned statically or dynamically.

The MIMM Client on the Mobile Host (MH) continuously scans for available networks and when it selects the best available network connectivity (or interface) other than the network connectivity (or interface) currently being used, it will configure the interface (e.g. ESSID and WEP key) to connect to the selected network. The MIMM Client may get assistance in the decision making from the MIMM Server in the network if present. It will then launch appropriate clients to conduct the necessary procedures to get authenticated, authorized into the network and obtain an IP address locally. If the network that it is connecting to is not the home network, the MIMM Client will then signal the Mobile IP agent running on the MH to register to the external Home Agent (x-HA). After obtaining the dynamic home address (IPX) from x-HA, the MIMM Client will then launch a VPN Client to setup the VPN tunnel between the MH and the VPS Gateway (VPN GW). The MIMM Client will then register to its internal Home Agent (i-HA) using the IP address (IPV) obtained from the VPN GW.

As described above, all of the procedures required for host mobility of a mobile MID can be automated without user intervention with the present invention.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A mobile multi-interface device (MID) having a plurality of network interfaces, comprising:
    a multi-interface mobility management (MIMM) client residing on said MID, said MIMM client including an interface monitor that monitors status of said plurality of network interfaces, and a mobility manager that determines which one of said plurality of network interfaces should be used by said MID and when said MID should switch from one interface to another, using information from said interface monitor;
    wherein said plurality of network interfaces provide access to a plurality of subnets, and said MIMM client further includes a plurality of virtual subnet devices, with each of said virtual subnet devices corresponding to a respective one of said plurality of subnets, wherein each of said virtual subnet devices aggregates a plurality of physical interfaces that are connected to the respective subnet, and wherein each of said virtual subnet devices is assigned an IP address from the respective subnet and is configured to appear as a network interface to IP and higher layers,
    further including each of said virtual subnet devices performing layer two handoffs between network interfaces in response to signals from said mobility manager.

2. The mobile MID as set forth in claim 1, wherein said mobility manager further performs an interface configuration operation.

3. The mobile MID as set forth in claim 1, wherein said mobility manager further performs user authentication and authorization operations.

4. The mobile MID as set forth in claim 1, wherein in connection with determination of when said MID should switch from one interface to another, said mobility manager utilizes a plurality of predefined network signal threshold levels.

5. The mobile MID as set forth in claim 4, wherein said mobility manager activates a selected interface for a future handoff operation prior to said handoff operation being determined as being necessary.

6. The mobile MID as set forth in claim 4, wherein said plurality of predefined signal threshold levels comprises a minimum signal level that indicates an interface is available for use.

7. The mobile MID as set forth in claim 4, wherein said plurality of predefined signal threshold levels comprises a minimum signal level that indicates an interface is active.

8. The mobile MID as set forth in claim 7, wherein said plurality of predefined signal threshold levels comprises a second threshold signal level that indicates that an active interface has become inactive and a handoff operation should be performed, when an active network signal level crosses below said second threshold signal level.

9. The mobile MID as set forth in claim 4, wherein said plurality of predefined signal threshold levels comprises a minimum signal level that indicates an interface is stable, allowing alternate interfaces of said MID to be disconnected or turned off.

10. The mobile MID as set forth in claim 4, wherein said plurality of predefined signal threshold levels comprises a first threshold signal level that indicates that at least one alternate interface should be proactively prepared for a handoff operation, when a stable network signal level crosses below said first threshold signal level, and a second threshold signal level below said first threshold signal level that indicates that an active interface has become inactive and a handoff operation should be performed, when an active network signal level crosses below said second threshold signal level.

11. A mobile MID as set forth in claim 1, further including a plurality of virtual subnet devices that aggregate physical interfaces connected to respective subnets, and wherein a separate one of said virtual subnet devices is instantiated for each respective subnet to which the mobile MID is connected.

12. A multi-interface mobility management system, comprising:
    a mobile multi-interface device (MID) having a plurality of network interfaces;
    a multi-interface mobility management (MIMM) client residing on said MID, said MIMM client including an interface monitor that monitors status of said plurality of network interfaces, and a mobility manager that determines which one of said plurality of network interfaces should be used by said MID and when said MID should switch from one interface to another, using information from said interface monitor and from a MIMM server; and a multi-interface mobility management (MIMM) server that collects information from said mobile MIDs, collects information from entities on other networks, and provides information to said mobile MIDs concerning whether and when to execute handoff operations to switch from an active network interface of said plurality of network interfaces to an alternative network interface of said plurality of network interfaces;

wherein said plurality of network interfaces provide access to a plurality of subnets, and said MIMM client further includes a plurality of virtual subnet devices, with each of said virtual subnet devices corresponding to a respective one of said plurality of subnets, wherein each of said virtual subnet devices aggregates a plurality of physical interfaces that are connected to the respective subnet, and wherein each of said virtual subnet devices is assigned an IP address from the respective subnet and is configured to appear as a network interface to IP and higher layers, further including each of said virtual subnet devices performing layer two handoffs between network interfaces in response to signals from said mobility manager.

13. A multi-interface mobility management system as set forth in claim 12, wherein said mobility manager further performs an interface configuration operation.

14. A multi-interface mobility management system as set forth in claim 12, wherein said mobility manager further performs user authentication and authorization operations.

15. A multi-interface mobility management system as set forth in claim 12, wherein in connection with determination of when said MID should switch from one interface to another, said mobility manager utilizes a plurality of predefined network signal threshold levels.

16. A multi-interface mobility management system as set forth in claim 15, wherein said mobility manager activates a selected interface for a future handoff operation prior to said handoff operation being determined as being necessary when signal strength drops below a first threshold, but does not use the new interface unless signal strength drops below a second threshold lower than said first threshold.

17. A multi-interface mobility management system as set forth in claim 15, wherein said plurality of predefined signal threshold levels comprises a minimum signal level that indicates an interface is available for use.

18. A multi-interface mobility management system as set forth in claim 15, wherein said plurality of predefined signal threshold levels comprises a minimum signal level that indicates an interface is active.

19. A multi-interface mobility management system as set forth in claim 18, wherein said plurality of predefined signal threshold levels comprises a second threshold signal level that indicates that an active interface has become inactive and a handoff operation should be performed, when an active network signal level crosses below said second threshold signal level.

20. A multi-interface mobility management system as set forth in claim 15, wherein said plurality of predefined signal threshold levels comprises a minimum signal level that indicates an interface is stable, allowing alternate interfaces of said MID to be disconnected or turned off.

21. A multi-interface mobility management system as set forth in claim 20, wherein said plurality of predefined signal threshold levels comprises a first threshold signal level that indicates that at least one alternate interface should be proactively prepared for a handoff operation, when a stable network signal level crosses below said first threshold signal level.

22. A multi-interface mobility management system as set forth in claim 12, wherein said MIMM server further communicates with a Real-Time Session (RTS) server to acquire information pertinent to network conditions.

23. A multi-interface mobility management system as set forth in claim 22, wherein said RTS server is a SIP server.

24. A multi-interface mobility management system as set forth in claim 12, wherein information provided to said mobile MIDs includes information regarding network connectivity quality.

25. A multi-interface mobility management system as set forth in claim 12, wherein information provided to said mobile MIDs includes proactive advice on whether and when to execute a handoff or roam operation into a particular network.

26. A multi-interface mobility management system as set forth in claim 12, wherein information provided to said mobile MIDs includes reactive advice to execute an immediate handoff or roam operation from the active network into another particular network when active network connectivity conditions have deteriorated below a predetermined level or upon occurrence of an unexpected network event necessitating switching to another network.

27. A multi-interface mobility management system, comprising:

a mobile multi-interface device (MID) having a plurality of network interfaces;

a multi-interface mobility management (MIMM) client residing on said MID, said MIMM client including an interface monitor that monitors status of said plurality of network interfaces, and a mobility manager that determines which one of said plurality of network interfaces should be used by said MID and when said MID should switch from one interface to another;

wherein in connection with determination of when said MID should switch from one interface to another, said mobility manager utilizes a plurality of predefined network signal threshold levels;

wherein said mobility manager activates a selected interface for a future handoff operation prior to said handoff operation being determined as being necessary when signal strength drops below a first threshold, but does not use the new interface unless signal strength drops below a second threshold lower than said first threshold.

* * * * *

UNITED STATES PATENT AND TRADEMARK OFFICE
CERTIFICATE OF CORRECTION

PATENT NO. : 7,835,743 B2
APPLICATION NO. : 11/196517
DATED : November 16, 2010
INVENTOR(S) : Zhang et al.

Page 1 of 1

It is certified that error appears in the above-identified patent and that said Letters Patent is hereby corrected as shown below:

In the Specification

In Column 6, Line 33, delete "(eq." and insert -- (e.g. --, therefor.

In Column 6, Line 52, delete "M-related" and insert -- AA-related --, therefor.

In Column 7, Line 3, delete "(eq." and insert -- (e.g. --, therefor.

Signed and Sealed this
Ninth Day of December, 2014

Michelle K. Lee
*Deputy Director of the United States Patent and Trademark Office*